D. LANDAU.
PROTECTING GUARD FOR SIPHONS, &c.
APPLICATION FILED AUG. 31, 1907.
915,364.
Patented Mar. 16, 1909.
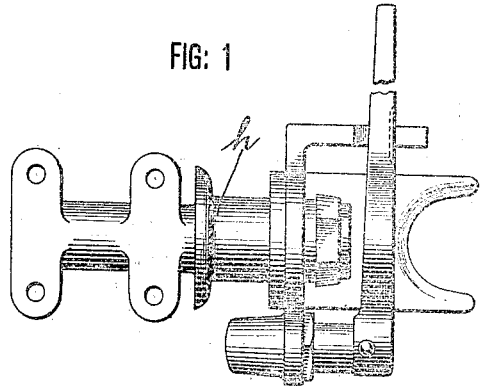
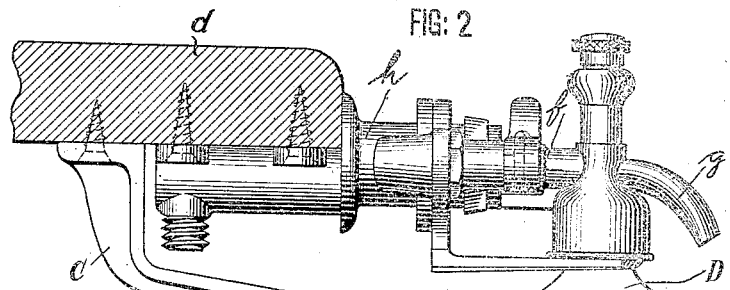
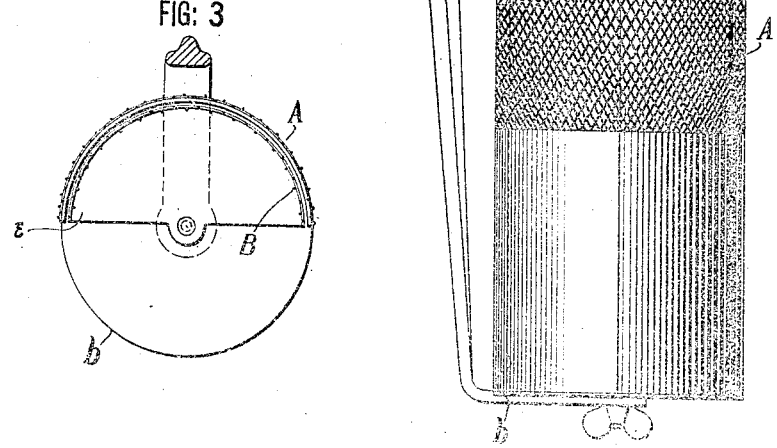
Witnesses:
Max B. A. Doring
W. Brown
Dewis Landau
Inventor

UNITED STATES PATENT OFFICE.

DEWIS LANDAU, OF SAN FRANCISCO, CALIFORNIA.

PROTECTING-GUARD FOR SIPHONS, &c.

No. 915,364.

Specification of Letters Patent.

Patented March 16, 1909.

Application filed August 31, 1907. Serial No. 390,865.

*To all whom it may concern:*

Be it known that I, DEWIS LANDAU, a citizen of the United States of America, and a resident of the city of San Francisco, State of California, have invented certain new and useful Improvements in Protecting-Guards for Siphons, &c., of which the following is a specification.

This invention relates to improvements in protecting guards for siphons and other liquid receptacles while being filled.

The purpose of the invention is to provide a guard which can be readily manipulated to insert and remove a siphon or other receptacle.

Referring to the drawings which accompany the specification to aid the description, Figure 1 is a plan view of the filling apparatus to which the guard is attached. Fig. 2 is a side elevation showing the guard in position and containing a siphon which is being filled. Fig. 3 is a horizontal section of the guard open to receive a siphon. Said guard is made in two parts A, B, (Fig. 3). Part A consists of half of a vertical cylinder of wire mesh or other suitable material secured on a cylindrical base plate $b$, which is supported by a bracket $c$ fastened to a counter or other supporting member $d$. On said base plate $b$ is pivoted the bottom $e$ of the said other part B of said guard, which said part B is preferably constructed solid but may also be of wire mesh. When the parts are in the open position of Fig. 3, a siphon D, or other vessel to be filled can be readily inserted. The said siphon may be of any suitable kind, and is shown in the drawings as one of my "self filling" siphon bottles, in which a filling valve in the bottle is opened by the operation of connecting the inlet of said siphon bottle with the nozzle $h$ of the filling device; $g$ being the nozzle of the siphon bottle. Then the part B is revolved, closing the open side of part A so that the vessel is completely inclosed by the wire mesh, which prevents injury to the attendant should the vessel explode while being filled. The mesh permits the attendant to observe the rise of liquid in the vessel and to control the filling accordingly.

The holder is preferably used in connection with the filling apparatus set forth in my application, Serial Number 390,864, filed August 31st, 1907, but is not restricted thereto.

Now having described my improvements I claim as my invention.

The combination in devices for protecting liquid receptacles during filling, of a bracket $c$ adapted to support said receptacle in relation to the filling device, a base $b$ for said receptacle carried by said bracket $c$, a semi-cylindrical shield A on said base adapted to partly inclose the receptacle, a bottom plate $e$ pivoted on said base $b$ so as to be rotatable on said base, and a semi-cylindrical shield B mounted on said bottom $e$ so as to rotate therewith and in one position to inclose and protect that part of the receptacle not inclosed by said shield A, and in other position to expose part of said receptacle and permit same to be removed from said shield A, substantially as described.

Signed at New York city this 30 day of August 1907.

DEWIS LANDAU.

Witnesses:
H. V. BROWN,
H. H. DE VOS.